US011220633B2

(12) United States Patent
Reverso et al.

(10) Patent No.: US 11,220,633 B2
(45) Date of Patent: Jan. 11, 2022

(54) PROCESS FOR THE THERMO-CATALYTIC CONVERSION OF POLYMERIC MATERIALS

(71) Applicant: BIORENOVA SOCIETA' PER AZIONI, Montorio al Vomano (IT)

(72) Inventors: Riccardo Reverso, Cremona (IT); Emanuele D'Abbondanza, Teramo (IT)

(73) Assignee: BIORENOVA SOCIETA' PER AZIONI, Montorio al Vomano (IT)

( * ) Notice: Subject to any disclaimer, the term of this patent is extended or adjusted under 35 U.S.C. 154(b) by 0 days.

(21) Appl. No.: 16/625,123

(22) PCT Filed: Jun. 28, 2017

(86) PCT No.: PCT/IT2017/000135
§ 371 (c)(1),
(2) Date: Dec. 20, 2019

(87) PCT Pub. No.: WO2019/003253
PCT Pub. Date: Jan. 3, 2019

(65) Prior Publication Data
US 2020/0148957 A1 May 14, 2020

(51) Int. Cl.
*C10G 1/08* (2006.01)
*B01J 23/14* (2006.01)
*B01J 35/12* (2006.01)
*C10G 1/10* (2006.01)

(52) U.S. Cl.
CPC .............. *C10G 1/086* (2013.01); *B01J 23/14* (2013.01); *B01J 35/12* (2013.01); *C10G 1/10* (2013.01); *B01J 2204/00* (2013.01); *B01J 2219/0099* (2013.01); *C10G 2300/1003* (2013.01); *C10G 2400/02* (2013.01); *C10G 2400/04* (2013.01)

(58) Field of Classification Search
CPC ........ C08F 8/50; C08F 110/02; C08F 110/06; C08F 2810/10; C10G 1/10
See application file for complete search history.

(56) References Cited

U.S. PATENT DOCUMENTS

| 3,974,206 | A | 8/1976 | Tatsumi et al. |
| 6,423,878 | B2* | 7/2002 | Reverso ............... B03B 9/061 585/241 |
| 2001/0056214 | A1 | 12/2001 | Reverso |
| 2011/0017114 | A1 | 7/2011 | Shaw |

FOREIGN PATENT DOCUMENTS

WO 2010070689 A1 6/2010

OTHER PUBLICATIONS

International Search Report dated Jan. 4, 2018 re: Application No. PCT/IT2017/000135, pp. 1-3, citing: US 2001/056214 A1, US 3 974 206 A and US 2011/0171114 A1.
Written Opinion dated Jan. 4, 2018 re: Application No. PCT/IT2017/000135, pp. 1-3, citing: US 2001/056214 A1, US 3 974 206 A and US 2011/0171114 A1.

* cited by examiner

*Primary Examiner* — Sharon Pregler
(74) *Attorney, Agent, or Firm* — Cantor Colburn LLP

(57) ABSTRACT

A continuous process for the cracking of a polymeric material, includes the continuous introduction of the polymeric material in a stream or bath of molten catalyst. A plant for the cracking of a polymeric material is also related and includes a closed circuit/environment containing a molten catalyst, and an element adapted to keep the molten catalyst in continuous motion.

14 Claims, No Drawings

PROCESS FOR THE THERMO-CATALYTIC CONVERSION OF POLYMERIC MATERIALS

TECHNICAL FIELD

The present disclosure relates to a process and a plant for the thermo-catalytic conversion of polymeric materials, in particular plastic waste, into liquid hydrocarbons suitable for use in the energy sector and in the transportation sector, or into chemical products that can be utilized in the industry.

BACKGROUND

Correct waste management is one of the most important global environmental challenges. The continuing increase of world population, together with economic growth and the related improvement in living conditions experienced by millions of people, mainly in developing countries, is leading at a global level to an exceptional increase in the production of waste.

Based on assessments made by the World Bank, it is estimated that approximately 10% of annual production of municipal solid waste alone is composed of plastic waste. Further studies conducted by the Ellen MacArthur Foundation together with McKinsey & Company, further, have shown that in the last 50 years the production of plastic waste has increased considerably and that the incorrect management of this type of waste causes great environmental damage, also to the marine ecosystem.

Recycling, waste-to-energy conversion and landfill disposal are known among the practices and technologies currently used for plastic waste management.

The recycling of plastic polymeric materials is a specific sector of waste recycling and consists of a set of operations performed on waste composed of plastic materials in order to obtain new material to be reintroduced in production processes. After the sorted waste collection step, the plastic is taken to first selection and treatment plants; it is then separated from other fractions and impurities and then divided by polymer type. In particular, low- and high-density PET and PE are selected. Various methods for mechanical recycling are known which are adapted to obtain flakes or granules which are then used to produce new objects.

However, it is estimated that differently from other types of waste, such as glass or metals, plastic waste cannot be recycled indefinitely and only 50% of the total of plastic waste can be reused validly in a production process, while the remaining 50% is not suitable for various reasons such as, by way of nonlimiting example, the excessive degree of contamination of plastics, the loss of technical properties due to past recycling/reuse cycles, the impossibility to perform a selection of the various types of plastic for finer fractions. This remaining 50% of plastic waste is currently disposed by waste-to-energy conversion or by landfill disposal.

Waste-to-energy conversion uses waste treatment plants (waste-to-energy plants) which allow to recover the heat generated during the combustion of said waste and use it to generate steam, which is then used to generate electric power or as a heat transfer medium, for example for remote heating. Although modern waste-to-energy conversion plants have many advantages with respect to simple incinerators, waste-to-energy conversion processes remain characterized by negative economic and environmental impacts; in general, they are unable to reach an economic balance only through the generation and sale of thermal and/or electric power. From the environmental standpoint, waste-to-energy conversion processes are characterized by all the negative impacts linked to waste combustion processes, such as, by way of nonlimiting example, emissions in the atmosphere, production of dangerous and non-dangerous waste, production of wastewater.

Currently, plastic polymeric materials that are not recycled and not sent to energy recovery by waste-to-energy conversion are commonly disposed in a landfill. Like the practice of waste-to-energy conversion, transfer to a landfill is characterized by negative economic and environmental impacts; landfills in fact generally have no other source of income except for disposal fees and therefore their economic/financial sustainability is entirely based on these fees. From the environmental standpoint, their construction and management generates several negative impacts, such as, by way of nonlimiting example, land utilization and pollution and the pollution of the surrounding water tables.

Waste-to-energy conversion and landfill disposal, despite constituting scarcely efficient management methods, with high negative impacts both from the economic standpoint and from the environmental standpoint, are currently the two most widespread practices worldwide for plastic waste management.

Landfill disposal is unquestionably the worst management mode, since in exchange for no tangible benefit it generates both high economic costs related to their provision and management and considerable negative environmental impacts, which are related mainly to land utilization and pollution thereof. Waste-to-energy conversion, although preferable to landfill disposal, entails, in exchange for the generation of electric and/or thermal energy, often with less than optimum conversion efficiencies, both considerable costs and significant negative environmental impacts, mainly in terms of atmospheric pollution. Both practices are at the lowest levels of the waste treatment hierarchy provided by European Union standards aimed at developing a circular economy, in which practices and applications aimed at reuse of materials/waste and their recycling to generate further products/raw materials are instead favored.

So-called "Plastic-To-Fuel" (PTF) technologies are known which consist of processes aimed at converting waste and plastic materials into liquid fuels or synthetic oils, mainly based on the two processes of simple pyrolysis and catalytic pyrolysis.

Technologies based on simple pyrolysis use only heat energy to facilitate the breakdown of the molecular bonds of polymers and, accordingly, to produce hydrocarbon molecules which, after a condensation or distillation process, are converted into liquid hydrocarbons with conversion yields which vary generally between 50% and 70%. The products generated by PTF technologies based on simple pyrolysis are heavy combustible oils, which do not have a sufficient quality to be used directly as fuels in the energy sector and in the transportation sector or as raw materials in the industrial sector.

PTF technologies based on catalytic pyrolysis are known. These technologies use the combined action of thermal energy and of a catalyst to break down the molecular bonds of polymers and therefore to produce hydrocarbon molecules which, after a condensation or distillation process, are converted into liquid hydrocarbons. There are different process variations within this category of PTF technologies; generally speaking, they are based mainly on a first step in which, by means of thermal energy, the waste/plastic materials are converted from the solid state to the liquid state, on a second pyrolysis step in which, again by means of thermal energy, in an oxygen-free environment, the first breakdown of the molecular bonds of the plastics is performed together with their conversion from the liquid state to the gaseous state, and on a third catalysis step, in which the gases produced by pyrolysis are placed in contact with a catalyst, normally in the solid state, so as to facilitate a deeper and more diffuse molecular breakdown. In some technologies, this distinction between pyrolysis and catalytic step is more substantial, with the provision of specific plant sections dedicated for the first, second and third steps of the process (by way of nonlimiting example, reference is made to the technologies developed by the companies Cynar Plc and Agylix Inc.), whereas in other applications the catalyst is injected continuously directly inside the pyrolysis reactor or is part of the walls of the reactor itself (by way of nonlimiting example, reference is made to the technologies developed by the company Demont Spa and to patent application WO2010070689). The above mentioned PTF technologies mainly use solid-state catalysts. These technologies have some drawbacks. First of all, they mainly use disposable catalysts, which must be introduced constantly in the process as true consumable raw materials, i.e., must be periodically replaced. Another drawback of most PTF technologies based on catalytic pyrolysis is that they require a pretreatment of the plastic waste by means of extruders or other similar apparatuses.

There is, therefore, the need to overcome the limitations of the practices and technologies currently used for plastic waste management by means of processes with greater economic and environmental sustainability.

SUMMARY

The aim of the present disclosure is to provide a process that is capable of performing a management of plastic waste that is economically advantageous, with a lower environmental impact than waste-to-energy conversion or landfill disposal processes.

Within this aim, the disclosure provides a process for the treatment of plastic waste that is aimed at recycling every main type of plastic waste, converting it, based on the type of waste processed, into energy products with high added value, usable in the energy sector and in the transportation sector, or into chemical products that can be used in the industry, further generating important economic advantages, with negligible negative environmental impacts.

The present disclosure further maximizes the level of recycling of plastic waste, reducing the costs linked to the management of the fraction of plastic waste that is not suitable for recycling and eliminating the environmental impacts generated by waste-to-energy conversion or landfill disposal practices.

The disclosure also provides a plant that is highly reliable, relatively simple to provide and at competitive costs.

This aim, as well as these and other advantages which will become better apparent hereinafter, are achieved by providing a continuous process for cracking a polymeric material, comprising the continuous introduction of said polymeric material into a stream or bath of molten catalyst.

The aim and advantages of the disclosure are also achieved by providing a plant for cracking a polymeric material, comprising a closed circuit or environment containing a molten catalyst, and means adapted to keep said molten catalyst in continuous motion.

Further characteristics and advantages of the disclosure will become better apparent from the detailed description that follows.

DESCRIPTION OF THE PREFERRED EMBODIMENTS

The present disclosure relates to the recycling of polymeric materials, in particular plastic waste, by means of their conversion into liquid hydrocarbons, which can be used in the energy sector to generate electric power and thermal energy and in the transportation sector as fuels, or into chemical products, which can be used in the production of polymers and in other applications in the chemical sector.

As mentioned, the primary goal of this technology is to offer a valid solution to the growing global problem of pollution caused by plastic waste, capable of eliminating all the negative environmental and economic impacts generated by the practices currently used for the management of this type of waste. Likewise, the present technology intends to provide a new source of energy products, or of basic raw materials, characterized by an extremely low environmental impact and carbon footprint.

I. Continuous Catalytic Cracking Process

The catalytic cracking process according to the disclosure is characterized in that it comprises a step that includes introducing one or more polymeric materials continuously in a stream or bath of molten catalyst.

The polymeric materials are thus introduced in a stream or bath inside which the (liquid) molten catalyst flows continuously. This allows better mixing of the polymeric materials with the catalyst and, therefore, an improvement of the quality of the reactions for breakdown of the molecular bonds of the plastics and recombination of the hydrocarbon molecules.

The continuous flow of the molten catalyst further allows to simplify considerably the catalyst cleaning activities, eliminating the downtimes caused by this activity, and to keep the catalyst involved in the depolymerization reactions always in the pure state, thus increasing the treatment capacity and improving the quality of the reactions.

In one embodiment, the process according to the present disclosure therefore comprises a step of continuous cleaning of the molten catalyst, eliminating from the molten catalyst solid products that are the result of the cracking of said one or more polymeric materials and any non-polymeric contaminants that are present together with said polymeric material.

The process according to the disclosure can be used for the treatment of the main types of polymeric materials, in particular plastic waste, such as linear plastics, among which mention is made, by way of nonlimiting example, of polypropylene (PP), polyethylene (PE), and polystyrene (PS), branched plastics, among which mention is made, by way of nonlimiting example, of polymethyl methacrylate (PMMA) and polyurethanes (PUR), and halogenated plastics, among which mention is made, by way of nonlimiting example, of polyvinyl chloride (PVC). Furthermore, the present disclosure is capable of processing both pure plastics, i.e., belonging to a single type, and mixtures of plastics of different types.

In one embodiment, the process of the present disclosure is therefore characterized in that the polymeric material is selected from the group consisting of:
 a linear chain plastic or a mixture of linear chain plastics;
 a halogenated plastic, for example PVC, or a mixture of halogenated plastics;

a branched chain plastic or a mixture of branched chain plastics;

a mixture of linear chain plastics and branched chain plastics;

a mixture of linear chain plastics and halogenated plastics;

a mixture of halogenated plastics and branched chain plastics;

a mixture of halogenated plastics, branched chain plastics, and linear chain plastics.

In one embodiment of the process according to the present disclosure, the polymeric material is contaminated by other non-polymeric materials.

In one embodiment of the process according to the present disclosure, the polymeric material is a mixture of polymeric materials that originate from the management of waste selected from the group consisting of municipal solid waste and special waste.

The tests conducted so far have shown that the treatment of plastic waste that belongs to a single type predominantly gives rise to the production of chemical products that can be reused in the polymer industry, as well as in other industrial applications, while the treatment of mixtures of different types of plastic causes the production of mixtures of hydrocarbons that can be used in the energy sector and in the transportation sector; by way of example, the tests conducted have demonstrated that by processing a mixture of heterogeneous plastics aimed at recreating the composition of Plasmix Corepla, i.e., the waste that derives from the activities of selection and recycling of plastic waste that originates from sorted waste collection performed by the Corepla platforms and formed predominantly by polypropylene (PP), polyethylene (PE), polystyrene (PS), and polyethylene terephthalate (PET), the present disclosure is capable of producing a mixture of liquid hydrocarbons that have characteristics that are entirely similar to kerosene.

The weight conversion ratio between the treated plastics and the liquid hydrocarbons, or the other chemical products, is comprised between 85% and 90%; i.e., between 85% and 90% of the weight of the treated plastics is converted into liquid hydrocarbons, or into other chemical products. The quality of these products is such that they can be introduced freely in the energy product market or in the chemical product market.

In greater detail, according to tests conducted on linear plastics (PP, PE, PS, PET), the liquid hydrocarbons produced by means of the present disclosure are characterized by, among others, a density comprised between 750 and 800 $kg/m^3$, by a lower heating value comprised between 42,000 and 44,000 kJ/kg and by a very low sulfur content; again according to the tests conducted on branched plastics and in particular on polymethyl methacrylate (PMMA), the generated chemical product has technical characteristics that are fully similar to those of methacrylate, i.e., the monomer of polymethyl methacrylate.

The remaining 10-15% of the weight of the treated plastics is converted into noncondensable gases, having a high heating value and composed of, among others, methane ($CH_4$), carbon monoxide (CO), traces of hydrogen ($H_2$) and alcohols, and a solid byproduct, essentially composed of carbon. While noncondensable gases are used predominantly to meet the energy demand of the process for catalytic cracking of the polymeric materials of the present disclosure, the solid byproduct is also placed on the market.

Based on the present disclosure, the production of the above-mentioned hydrocarbons or of the other chemical products starting from polymeric materials is performed by means of a thermo-catalytic process, by means of which the macromolecular breakdown of the polymeric bonds, and therefore the forming of molecules of hydrocarbons or of other chemical compounds, is provided.

In this regard, the present disclosure has some similarities with the fluid bed catalytic cracking process used in petrochemical refineries, where the heavy hydrocarbons that arrive from other refining steps are converted into light hydrocarbons that have a higher added value, such as diesel fuel and gasoline. However, there are many differences which characterize the catalytic cracking process of the plastic materials of the present disclosure.

First of all, the two processes use entirely different raw materials and this, moreover, entails that substantially different chemical reactions are performed within them. Furthermore, the fluid bed catalytic cracking used in petrochemical refineries uses types of catalysts that are entirely different from those provided by the process according to the present disclosure. In fact, while the process used in a refinery predominantly uses powdered alumina or catalysts based on zeolites, the present disclosure predominantly uses metallic based catalysts.

Furthermore, the catalysts used in fluid bed catalytic cracking are in the solid state in the form of powders, while those used in the process of the present disclosure are in the liquid state. Finally, fluid bed catalytic cracking is performed at temperatures that can vary between approximately 650° C. and 750° C., while the process of the present disclosure can operate at significantly lower temperatures. In particular, in one of its embodiments the process according to the disclosure is characterized in that the catalyst is kept at a temperature of 300-550° C., preferably 350-500° C. The definition of the operating temperature of the process is determined mainly by the type of plastic waste to be treated and by the composition of the catalyst.

In one embodiment, the catalyst melts at a temperature of 330° C. or less.

In one embodiment of the process according to the disclosure, the catalyst is a metal or a mixture of metals, optionally mixed with an acid component.

In one embodiment, the catalyst is selected from the group consisting of lead, tin, zinc, antimony, cadmium and magnesium and mixtures thereof, optionally mixed with other metals and/or an acid component.

In one embodiment, the catalyst is lead, a lead-zinc mixture, a lead-tin mixture, a lead-zinc-tin mixture, a zinc-antimony mixture, a lead-copper mixture, a lead-antimony mixture, a lead-cadmium mixture, or a lead-magnesium mixture, optionally mixed with an acid component.

In one embodiment of the process according to the disclosure the catalyst is lead.

In another embodiment, the catalyst is a mixture of metals chosen from the group selected from:

a tin-lead mixture in which tin is present in a quantity comprised between 5% and 35% by weight on the total weight of the mixture;

a lead-antimony mixture, in which antimony is present in a quantity comprised between 2% and 20% by weight on the total weight of the mixture;

a tin-lead-zinc mixture, in which tin is present in a quantity comprised between 25% and 40% and zinc is present in a quantity comprised between 1% and 5% by weight on the total weight of the mixture;

a lead-cadmium mixture, in which cadmium is present in a quantity comprised between 10% and 40% by weight on the total weight of the mixture; and a lead-magnesium mixture, in which magnesium is present in a quantity comprised between 1% and 5% by weight on the total weight of the mixture.

In one embodiment, the catalyst is mixed with an acid component and said acid component is selected from metallic silicates, metallic carbonates, and mixtures thereof.

In one embodiment, the catalyst is mixed in with an acid component which is an aluminum silicate or a lead carbonate.

In one embodiment, the molten catalyst stream flows continuously inside a pipe.

In one embodiment, the molten catalyst stream conveys the polymeric material through said pipe inside a reactor.

In the process according to the disclosure, the reaction for breakdown of the molecular bonds of the polymeric materials and the forming of the hydrocarbon molecules begins when the polymeric materials to be treated are immersed within the continuous stream of molten (liquid) catalyst.

The introduction of the polymeric materials within the stream of liquid catalyst causes the creation of turbulences within the stream itself, facilitating intimate contact between the catalyst and the polymeric materials. These materials, together with the reaction products that begin to form within the catalyst stream, are then conveyed by the stream into a reaction reactor, also known as cracking reactor, where the reaction for breakdown of the molecular bonds of the polymers and the forming of the hydrocarbon molecules continues. By way of nonlimiting example, the detail of the reactions that can be hypothesized to occur during the process for catalytic cracking of polymeric materials is given hereinafter:

i) when the polymers are immersed in the catalyst, the carbon-carbon bonds that form their molecules break down and the resulting radicals are fixed to the catalyst; in this step, a series of electrons is released, with consequent forming of aliphatic compounds;

ii) the catalyst assumes acid characteristics and the aliphatic components migrate on its surface, are protonated and therefore become carbocations;

iii) carbocations can undergo different types of reactions such as, by way of nonlimiting example, they can break into two fragments, isomerize or undergo cyclizations; at the end of these reactions in any case they lose a proton, restoring the activity of the catalyst, and migrate to the surface in the form of gas.

The products generated by the reaction for catalytic cracking of polymeric materials, known as cracking gases and in a gaseous state, proceed toward the upper part of the reactor, emerge from the catalyst and are then conveyed into a condensation column, or another condensation system, where they are converted into the liquid state and are then stored in an adapted tank. Liquid hydrocarbons, or the other chemical products thus produced, are then destined for sale as energy products or fuels, or as raw materials for industry.

The noncondensable fraction of the cracking gases, which is, among others, composed of methane ($CH_4$), carbon monoxide (CO), traces of hydrogen ($H_2$) and traces of alcohols, is conveyed into a wet scrubbing system, or another scrubbing system capable of purifying the gases from the presence of any acid compounds, such as, by way of nonlimiting example, hydrochloric acid (HCl), hydrofluoric acid (HF) and hydrogen sulfide ($H_2S$). These unwanted substances can in fact be present in noncondensable gases if halogenated plastics, such as, by way of nonlimiting example, polyvinyl chloride (PVC), are present within the treated plastic waste.

If one is certain that the stream of polymeric materials in input to the plant is free from halogenated plastics, scrubbing of the noncondensable gases can be avoided. The noncondensable gases purified of the unwanted components are stored within a gas holder, or another storage system for gases, and are then used to meet the energy demand of the process for catalytic cracking of waste and plastic materials.

The carbon byproduct generated during the cracking reaction, due to a difference in density, deposits on the surface of the catalyst and is conveyed through the stream of the closed circuit into a second reactor, which is known as cleaning reactor. Inside the latter, the carbon byproduct, by means of an adapted collection system, is conveyed into a collection chamber that is arranged outside the reactor and from there it is deposited by gravity inside so-called "big bags" or another system for the collection of powdery solid materials.

It is specified that the entire environment of the closed circuit of the liquid catalyst, of the system for introducing the plastic materials within the stream of the catalyst, and the carbon residue collection chamber, are kept constantly in an oxygen-free environment, also by introducing inert gases, preferably nitrogen.

II. Plant for Cracking a Polymeric Material

In a second aspect, the present disclosure relates also to a plant for performing the process for catalytic cracking of polymeric materials as described above. In particular, the plant for the cracking of a polymeric material according to the present disclosure comprises a closed circuit or environment that contains a molten catalyst and means adapted to keep said molten catalyst in continuous motion.

By means of the continuous motion of the molten catalyst, a continuous stream of molten catalyst is generated inside the closed circuit/environment. As already mentioned, this continuous stream allows better mixing of the polymeric material with the catalyst and further simplifies the activities for cleaning said catalyst.

In one embodiment of the plant according to the disclosure, the means suitable to keep the molten catalyst in continuous motion comprise one or more pumps.

In one embodiment, the plant according to the disclosure further comprises:

one or more reactors, of which at least one cracking reactor, suitable to perform the reaction, and at least one cleaning reactor, suitable to clean the catalyst, or a single reactor divided into at least two sections, of which at least one cracking section, suitable for performing the cracking reaction, and at least one cleaning section, suitable for cleaning the catalyst;

one or more loading systems adapted to introduce said polymeric material in the closed circuit/environment;

one or more systems for connection between said reactors/sections.

II. A. Cracking and Cleaning Reactors/Sections

The reactors are essentially heated and thermally insulated tanks inside which there is a constant quantity of catalyst. They can have different shapes, although the cylindrical shape is preferred, and they are built with materials that are adapted to withstand high temperatures. The reactors can be heated with various methods and preferably by resorting to gas or dual fuel gas/liquid burners, or by means of an electrical system, and in any case all having such power as to ensure the reaching and holding of the operating temperature inside the reactor, which depending on the type of catalyst used can vary between 300° C. and 550° C. Thermal insulation is provided according to the methods and materials that are known by the person skilled in the art and in any case so that outward heat losses are contained and the stability of the temperature inside the reactor is ensured, efficiently and effectively. Moreover, each reactor is provided with two or more flanges for the connection of the pipes in which the stream of molten catalyst is channeled, of which at least one is arranged close to the bottom of the reactor, one or more sensors for controlling the internal temperature, one or more sensors for monitoring the level of the molten catalyst. An inert atmosphere, without oxygen, is maintained inside the reactors and is ensured also by means of the continuous introduction of inert gases, preferably nitrogen.

The specifications mentioned above are common to all types of reactor, i.e., to the cracking reactor, to the cleaning reactor, and to the single reactor, if the plant provides for a single reactor divided into multiple sections. Each particular reactor type further has the following specific main characteristics:

Cracking reactor: its capacity varies depending on the treatment capacity of the entire plant and is calculated by following a ratio between kg/h of treated waste/plastic material and liters of catalyst equal to 0.5:1 or higher. The ratio between the volume occupied by the catalyst and the total useful volume of the reactor is variable, but it preferably lies between 2:3 and 3:4. The cracking reactor is provided with at least one section, preferably one section, which can be provided with an internal labyrinth in order to maximize the contact time between the waste/plastic material and the catalyst. Moreover, the cracking reactor is provided with at least one opening on the upper part, preferably one opening, by means of which the cracking gases are conveyed into the condenser.

Cleaning reactor: its capacity varies depending on the treatment capacity of the entire plant and is calculated by following a ratio between kg/h of treated polymeric materials and liters of catalyst equal to 0.5:1 or higher. The ratio between the volume occupied by the catalyst and the total of the useful volume of the reactor is variable, but preferably it is between 1:2 and 2:3. The cleaning reactor is provided with two or more sections, preferably two or three sections, the last of which is always assigned to the collection and expulsion from the plant of the carbon residue and of any other impurities. In the case of a cleaning reactor with three sections, the catalyst that arrives from the cracking reactor, contaminated by the carbon residue or by other impurities, is introduced in the first section, where, by means of a spillway system, the pure catalyst is separated from the contaminated catalyst. The latter is poured into the second section, while the pure catalyst remains in the first section; by means of a channel arranged in the lower part of the first section, the pure catalyst is then picked up and sent again toward the base of the cracking reactor. Inside the second section, again by means of a spillway system, a further separation between pure catalyst and contaminated catalyst occurs; the former remains stored within the second section and by means of a channel arranged in the lower part of the section is poured periodically into the first section, while the contaminated catalyst is sent to the third and last section, where, by means of a system for the collection and handling of powdered solids, the carbon residue and any other impurities are periodically guided within a collection chamber and then expelled from the plant. The third section also is provided with a channel in the lower part, through which the catalyst is periodically poured into the first section. In order to allow the movement of the catalyst between the various sections of the cleaning reactor, the reactor is provided with one or more pumps.

Combined reactor: it is used if the plant for catalytic cracking of polymeric materials is formed by a single reactor. It comprises at least one cracking section, preferably one, and at least one cleaning section, preferably one; the latter in turn can be divided into two or more subsections, preferably two or three. The capacity of the combined reactor varies depending on the treatment capacity of the entire plant and is calculated by following a ratio between kg/h of waste and/or plastic materials treated and liters of catalyst equal to 0.5:1 or higher. The ratio between the volume occupied by the catalyst and the total of the useful volume of the reactor is variable but is preferably between 1:2 and 3:4. The cracking section can be provided with an internal labyrinth in order to maximize the contact time between the waste/plastic materials and the catalyst; the cracking section and the cleaning section are connected by a spillway which allows the contaminated catalyst to be transferred from the cracking section to the cleaning section. Inside the cleaning section a process for the separation and purification of the catalyst occurs which is entirely similar to the one referenced in the description of the cleaning reactor, with the only difference that the pure catalyst, taken from the base of the cleaning section, is again introduced in the base of the cracking section and not in a different reactor. The combined reactor is further provided with at least one opening on the upper part, preferably one, by means of which the cracking gases are conveyed inside the condenser.

In one embodiment, the cleaning reactor or the cleaning section of the combined reactor are provided with a system for the separation and expulsion of the solid products that are the result of the cracking of said polymeric material and of any non-polymeric contaminants that are present together with said polymeric material.

In one embodiment, said system for separation and expulsion of said solid products comprises a surface scraper and by a slot by means of which said solid product is conveyed into an adapted expulsion chamber, from which it is then expelled from the plant via gravity.

II.B. Connections Between Reactors/Sections and Means for Moving the Catalyst

The connections between the various reactors or, if the plant is provided with a single reactor, between the various sections include pipes adapted to accommodate inside them the continuous stream of catalyst, manufactured with materials adapted to withstand high temperatures, thermally insulated and optionally provided with a heating system, preferably of the electric type, which is used mainly to bring the pipes to the desired temperature during the startup step of the plant and, if necessary, to allow further heating of the catalyst. The thermal insulation is provided according to the methods and materials that are known to the person skilled in the art and in any case so that outward losses of heat are contained and the stability of the temperature of the catalyst that flows inside the pipes is ensured, effectively and efficiently. Each connection can be provided moreover with at least one or more valves for opening and closing the connection, one or more sensors for controlling the temperature, with one or more valves for discharging the catalyst.

The connection that joins the cleaning reactor to the cracking reactor or, in the case of a single reactor, the cleaning section to the cracking section, in which the stream of clean catalyst flows from the cleaning reactor/section to the cracking reactor/section, in addition to supplying the latter with pure catalyst has a role in the loading of the polymeric material into the plant. This connection is in fact connected to the system for loading the polymeric material, preferably by means of a T-shaped coupling, and has a particular shape which facilitates the introduction of the polymeric material within the stream of liquid catalyst.

In order to regulate the speed of the stream of catalyst and therefore of the quantity of material to be treated, the connection is further provided with at least one pump coupled to an inverter. The size of the pump, selected preferably in the category of gear pumps or semi-immersion pumps, is variable depending on the treatment capacity of the plant; this size is in any case developed so as to ensure a stream of catalyst that is necessary and sufficient for the treatment of the material to be treated that arrives from the T-shaped coupling.

II.C. Loading System

The loading system is the component of the plant designated to introduce the plastic materials in the stream of molten catalyst. The plant can be provided with one or more loading systems, of a single type or of various types, depending on the desired production capacity and on the material to be treated.

In one embodiment of the plant according to the disclosure, one or more loading systems allow to introduce continuously and adjustably the polymeric material in the stream of catalyst.

In one embodiment of the plant, said one or more loading systems are provided with one or more systems for cooling the polymeric material and/or with one or more systems for milling the polymeric material.

The loading of the polymeric material within the stream of liquid catalyst can be performed in various manners, such as, by way of nonlimiting example, by means of a piston or by means of an extruder.

In a preferred embodiment, each loading system comprises at least one loading tank and at least one loading screw feeder, preferably two loading tanks and two loading screw feeders. In this last configuration, the first loading tank receives the plastic waste that arrives from the storage silos and, by means of the first loading screw feeder, moves the waste into the second loading tank. From the latter, the plastic, by using the second loading screw feeder, is conveyed into a pipe connected to the connection, through which the stream of pure catalyst flows from the cleaning reactor/section to the cracking reactor/section and is then conveyed into the latter. It is specified that the second loading screw feeder can be optionally replaced with a loading piston.

An inert, oxygen-free atmosphere is maintained inside the loading system also by means of the continuous introduction of inert gases, preferably nitrogen, in at least one of the loading tanks. The introduction of inert gas also controls the pressure of this area.

Each loading system is provided with at least one system for isolating the temperatures in the vicinity of the coupling to the connection in which the stream of catalyst flows and can be provided with one or more cooling systems, preferably two, preferably arranged on the second loading tank and in the vicinity of the coupling to the connection through which the stream of catalyst flows. This solution keeps under control the temperature of the material to be treated.

In a preferred embodiment, said one or more loading systems adapted to introduce said polymeric material in the stream of catalyst operate by means of the combined use of the thrust of a last loading screw feeder and of the suction produced by the partial vacuum generated by means of the geometry of the connecting pipe, in the vicinity of the coupling point between the connecting pipe and the loading system.

This embodiment allows the plant of the present disclosure to avoid resorting to an extruder for the introduction of the polymeric materials in the stream of molten catalyst and allows to save on the considerable energy consumption usually required by the application of an extruder and to improve the quality of the depolymerization reaction, since the plastics are introduced in the catalyst without undergoing any preliminary chemical-physical transformation.

In a preferred embodiment, the geometry of the connecting pipe in the vicinity of the coupling point between the connecting pipe and the loading system includes a reduction in cross-section.

II.D. System for Condensation, Collection, Storage and Handling of the Liquid Hydrocarbons or of the Other Chemical Products Generated by the Cracking Process This component of the plant is assigned to the condensation of the cracking gases produced inside the cracking reactor/section and to the management and handling of the corresponding liquid hydrocarbons or of the other chemical products generated by the cracking process.

The condensation of the cracking gases can be performed by means of one or more condensers of various types adapted to treat hydrocarbons and chemical products such as, by way of nonlimiting example, plate columns and spiral heat exchangers, and the size of which is determined according to the treatment capacity of the entire plant. The condenser is connected directly to the cracking reactor/section, so as to reduce as much as possible the time between the forming and the condensation of the cracking gases.

The liquid hydrocarbons or the other chemical products generated by the condensation of the cracking gases are collected in a small intermediate tank and from there, by means of one or more specific pumps for moving hydrocarbons, are transferred into the main storage tank. The useful volume of the main storage is variable as a function of the treatment capacity of the entire plant and of the logistical requirements of the site in which it is installed; if necessary, the main storage tank can be further provided with a system for introducing and dosing additives. The treatment capacity of the entire plant and the logistical requirements of the site where it is installed also influence the method of final handling of the hydrocarbons or of the other chemical products, which can be packaged into drums or canisters, by using a drum filling system, or loaded directly into adapted tank trucks, by using loading bays, of the type normally used in the oil and chemical sector.

II.E. System for Cleaning, Storing and Managing Noncondensable Gases

The plant for cracking a polymeric material can further comprise a system for cleaning, storing and managing the noncondensable gases produced in the cracking process.

Downstream of the condensation of the cracking gases, the noncondensable components are sent into a purification system in order to eliminate any acid components, such as, by way of nonlimiting example, hydrochloric acid (HCl), hydrofluoric acid (HF), and hydrogen sulfide ($H_2S$).

This purification is performed by means of systems traditionally used in the industry of gas and fume purification, such as, by way of nonlimiting example, wet scrubbing towers, semi-dry scrubbing towers, or dry reaction towers; this purification system is connected directly to the condenser. The purified gas is conveyed, by means of connections similar to the ones used for the conveyance of natural gas, into a temporary storage.

The size and type of the storage system is determined on the basis of the production capacity of the plant and on the basis of the logistical requirements expressed by the site where it is installed and can in any case comprise all the types of storage currently used for the accumulation of natural gas such as, by way of nonlimiting example, pressure-controlled accumulators, gas holders, pressurized rigid tanks.

The stored gas is then used primarily to meet the energy demand of the plant. In more detail, if the reactor or reactors are kept at temperature by means of one or more gas-fueled or gas/liquid dual fuel burners, the temporary storage of the noncondensable gases is connected to these burners and the noncondensable gases are used directly to meet the thermal energy demand of the plant; the temporary storage of the noncondensable gases can further be connected to a gas-fueled cogeneration system in order to give an energy value also to any excess noncondensable gas.

The apparatus can be provided with a cogeneration system which is gas-fueled even if the reactors or the reactor are kept at temperature by means of an electrical system. Finally, the temporary storage of the noncondensable gases is also connected to a safety torch. The size of all the components of the system for cleaning, storing and managing the noncondensable gases is calculated on the basis of the production capacity of the plant, considering that a fraction equal to approximately 5-10% of the weight of the plastics in input to the plant is normally converted into noncondensable gases.

II.F. Accessory Components

In addition to the components described above, the plant for catalytic cracking of polymeric materials according to the present disclosure can further comprise the following accessory components:

Nitrogen generator: as mentioned earlier, the catalytic cracking process of the present disclosure is performed in an inert, oxygen-free environment. In order to ensure this condition, the apparatus can comprise a nitrogen generator which allows the on-site production of the necessary inert gas.

Refrigeration unit: it is dedicated to the production of refrigeration energy that is required for the condenser and for any cooling system of the loading system.

Electrical panels and connections and electronic control system and monitoring sensors: it is constituted by the set of electrical and electronic connections with which the plant is provided for its supply and control; the latter is structured by resorting to the methods traditionally used in the industrial sector, such as, by way of nonlimiting example, the PLC system. Among the types of sensor used in the plant, mention is made, by way of nonlimiting example, of sensors for monitoring temperatures, pressures, flow rates, sensors for monitoring the composition of noncondensable gases.

II.G. Pretreatment System

The apparatus according to the present disclosure can optionally comprise a pretreatment system. The machines and the processes used in the pretreatment system are known to operators in the field of waste recycling and therefore the pretreatment system is mentioned here for descriptive purposes.

In order to maximize the effectiveness and efficiency of the process for catalytic cracking of polymeric materials, it is convenient for the polymeric materials in input to have a uniform size, preferably with a particle size of no more than 10 mm, and free from waste or metallic materials. Any presence of nonmetallic foreign objects, such as, by way of nonlimiting example, glass, wood, paper, inert materials and other organic materials, is instead not a problem.

If the polymeric materials in input to the plant according to the present disclosure do not have the optimum characteristics referenced above, it is necessary to provide a pretreatment system. The pretreatment system is composed substantially of a combination of existing machines, such as, by way of nonlimiting example, shredders, hammer and/or blade mills, magnetic and aeraulic sorting machines.

Depending on their source, the plastic waste is characterized by different degrees of cleanliness, as well as by a different composition with reference to the various types of plastics; therefore the pretreatment system, if necessary, must be modulated at each application, so as to meet the specific operating requirements that this application requires.

II.H. Catalyst Used in the Cracking Apparatus

In one embodiment, the catalyst used in the apparatus according to the present disclosure is a metal or a mixture of metals, optionally mixed with an acid component.

In a preferred embodiment, the catalyst used in the plant according to the present disclosure is selected from the group that consists of lead, tin, zinc, antimony, cadmium and magnesium and mixtures thereof optionally mixed with other metals and/or an acid component.

In a more preferred embodiment, the catalyst used in the plant according to the present disclosure is selected from the group that consists of lead, a lead-zinc mixture, a lead-tin mixture, a lead-zinc-tin mixture, a zinc-antimony mixture, a lead-copper mixture, a lead-antimony mixture, a lead-cadmium mixture and a lead-magnesium mixture, optionally mixed with an acid component.

In a particularly preferred embodiment, the catalyst used in the plant according to the present disclosure is lead.

In another particularly preferred embodiment, the catalyst used in the apparatus according to the present disclosure is a mixture selected from the group consisting of a lead-tin mixture, in which tin is present in a quantity comprised between 5% and 35% by weight on the total weight of the mixture;

a lead-antimony mixture, in which antimony is present in a quantity comprised between 2% and 20% by weight on the total weight of the mixture;

a lead-tin-zinc mixture, in which tin is present in a quantity comprised between 25% and 40% and zinc is present in a quantity comprised between 1% and 5% by weight on the total weight of the mixture;

a lead-cadmium mixture, in which cadmium is present in a quantity comprised between 10% and 40% by weight on the total weight of the mixture; and a lead-magnesium mixture, in which magnesium is present in a quantity comprised between 1% and 5% by weight on the total weight of the mixture.

In the embodiments in which the catalyst is mixed with an acid component, the acid component can be selected from metallic silicates, metallic carbonates, and mixtures thereof.

In one embodiment, the acid component mixed with the catalyst used in the plant according to the present disclosure is an aluminum silicate or a lead carbonate.

The process and the plant according to the present disclosure have considerable advantages with respect to known technologies for recycling waste and plastic materials, overcoming the drawbacks of these known technologies and thus achieving the intended aim and objects.

The present disclosure in fact obviates the limitations of mechanical recycling, since it allows to recycle every main type of plastic waste, converting it, depending on the type of treated waste, into energy products with high added value, usable in the energy sector and in the transportation sector, or into chemical products that can be used in industry. This capability allows to maximize the level of recycling of plastic waste, reducing the costs linked to the management of the fraction that is not suitable for recycling and eliminating the environmental impacts generated by waste-to-energy conversion or landfill disposal practices used for their management.

Furthermore, with respect to waste-to-energy conversion and landfill disposal practices, the process and the plant according to the present disclosure allow to perform an economically advantageous management, even without resorting to any disposal fee, since the sale of the products generated by the transformation of the plastic waste allows to produce a significant economic and financial return. From the environmental standpoint, the present disclosure does not exhibit the problems linked to waste-to-energy conversion processes and to the practice of landfill disposal. Differently from waste-to-energy conversion, the present disclosure in fact does not provide for the combustion of plastic waste and instead provides a production cycle that is characterized by minimal negative environmental impacts. Furthermore, with respect to landfill disposal, the present disclosure does not require resorting to large spaces and does not provide for the production of significant quantities of wastewater that may pose a threat for the surrounding ground or water tables.

Moreover, with respect to PTF technologies based on simple pyrolysis, the present disclosure first of all shows distinctly higher conversion yields of the waste/plastic materials into liquid hydrocarbons. The present disclosure in fact allows to convert between 85% and 90% of the weight of the plastics in input into liquid hydrocarbons, whereas alternative PTF technologies based on simple pyrolysis have conversion yields that vary generally between 50% and 70%. Secondly, the present disclosure generates hydrocarbons or other chemical products of high quality (kerosene or monomers) which generally can be used directly as fuels in the energy sector and in the transportation sector or as raw materials in the industrial sector. Products generated by PTF technologies based on simple pyrolysis instead normally fall within the field of heavy fuel oils or in the generic field of pyrolysis oils, which have a lower added value. Finally, the use of a catalyst allows to reduce the time for transformation of the waste/plastic materials into hydrocarbons, with respect to the ones required with the use of thermal energy alone, as provided by PTF technologies based on simple pyrolysis. As a direct consequence, plants based on the present disclosure are more compact, simpler and economically less onerous both to produce and to manage with respect to the ones based on simple pyrolysis.

Furthermore, as regards PTF technologies based on catalytic pyrolysis, the present disclosure provides for the activity for breakdown of the molecular bonds of the polymers and their transformation from the solid state to the gaseous state to be performed by means of a single step, in which the waste/plastic materials in the solid state and in the form of granules and/or flakes are immersed directly within a metallic catalyst that is kept in the liquid state by using thermal energy. The molecular bond breakdown reaction occurs when the waste/plastic materials are placed in contact with the catalyst and there is no dual transition between the action of the thermal energy and that of the catalyst. Further process differences can further be found:

i. in the type of catalyst used, since alternative PTF technologies mainly use solid-state catalysts, while the present disclosure uses only liquid-state catalysts;

ii. in the manner of use of the catalyst, since alternative PTF technologies mainly use disposable catalysts, which must be constantly introduced in the process as true consumable raw materials or must be replaced periodically; the present disclosure does not provide for continuous introduction of catalyst or periodic replacement thereof since the process described herein has an autonomous system for the cleaning and regeneration of the catalyst;

iii. in the pretreatment mode and in the state of the plastic waste in input to the conversion processes, since most alternative PTF technologies based on catalytic pyrolysis resort to the use of extruders or to other similar plants to pretreat the plastics in input, so as to be able to introduce them in the conversion reactors in the liquid state. The present disclosure does not provide for any thermal pretreatment of the plastic waste in input, for which, if necessary, there is only a mechanical pretreatment, which is aimed at rendering uniform the size of the flakes and/or granules prior to entering the reactor.

These basic differences allow the present disclosure to obtain substantially better operational and economic results than those of alternative PTF technologies based on catalytic pyrolysis. First of all, the present disclosure exhibits distinctly higher conversion yields of the waste/plastic materials into liquid hydrocarbons; the present disclosure in fact allows to convert between 85% and 90% of the weight of the plastics in input into liquid hydrocarbons, whereas alternative PTF technologies based on catalytic pyrolysis have conversion yields that vary generally between 75% and 85%. Secondly, as regards the quality of the products, alternative technologies based on catalytic pyrolysis achieve extremely different results, with some technologies being able to produce high-quality fuels (reference is made, by way of nonlimiting example, to Cynar Plc technology), while others obtain less refined products such as heavy oils and/or mixed oils and synthetic petroleums to be refined (reference is made, by way of nonlimiting example, to the technologies of Agylix Inc., Demont Spa and Blest Inc.). Differently, the present disclosure generates high-quality products, such as hydrocarbons with characteristics that are fully similar to those of kerosene, as demonstrated by analyses performed by third-party laboratories on hydrocarbon samples produced during tests of the technologies with a pilot plant. Finally, it has been found, by means of a comparison performed between alternative PTF technologies based on catalytic pyrolysis currently being industrialized and the present disclosure, that the latter has significantly lower expected investment and management costs than the former. This being said, it is predicted that the present disclosure is capable of producing economic results that are significantly superior to those that can be obtained by alternative PTF technologies based on catalytic pyrolysis.

the molten catalyst in continuous motion.

The invention claimed is:

1. A continuous process for the cracking of a polymeric material, the process comprising the continuous introduction of said polymeric material in a stream of molten catalyst, wherein said molten catalyst stream flows continuously inside a pipe and said molten catalyst stream conveys said polymeric material through said pipe into a reactor.

2. The process according to claim 1, further comprising the continuous cleaning of the molten catalyst, eliminating from the molten catalyst solid products that result from cracking of said polymeric material, and any non-polymeric contaminants that are present together with said polymeric material.

3. The process according to claim 1, wherein said catalyst is kept at a temperature of 300-550° C.

4. The process according to claim 1, wherein said catalyst melts at a temperature of 330° C. or less.

5. The process according to claim 1, wherein said catalyst is a metal or a mixture of metals.

6. The process according to claim 1, wherein said catalyst is selected from the group consisting of lead, tin, zinc, antimony, cadmium and magnesium and mixtures thereof.

7. The process according to claim 6, wherein said catalyst is selected from the group consisting of lead, a lead-zinc mixture, a lead-tin mixture, a lead-zinc-tin mixture, a zinc-antimony mixture, a lead-copper mixture, a lead-antimony mixture, a lead-cadmium mixture, and a lead-magnesium mixture.

8. The process according to claim 7, wherein said catalyst is lead.

9. The process according to claim 7, wherein said catalyst is a mixture of metals selected from the group consisting of:
  a lead-tin mixture in which tin is present in a quantity comprised between 5% and 35% by weight on the total weight of the mixture;
  a lead-antimony mixture, in which antimony is present in a quantity comprised between 2% and 20% by weight on the total weight of the mixture;
  a lead-tin-zinc mixture, in which tin is present in a quantity comprised between 25% and 40% and zinc is present in a quantity comprised between 1% and 5% by weight on the total weight of the mixture;
  a lead-cadmium mixture, in which cadmium is present in a quantity comprised between 10% and 40% by weight on the total weight of the mixture; and
  a lead-magnesium mixture, in which magnesium is present in a quantity comprised between 1% and 5% by weight on the total weight of the mixture.

10. The process according to claim 5, wherein said catalyst is mixed with an acid component selected from metallic silicates, metallic carbonates, and mixtures thereof.

11. The process according to claim 10, wherein said catalyst is mixed with an acid component selected from an aluminum silicate and a lead carbonate.

12. The process according to claim 1, wherein said polymeric material is selected from the group consisting of:
  a linear chain plastic or a mixture of linear chain plastics;
  a halogenated plastic, for example PVC, or a mixture of halogenated plastics;
  a branched chain plastic or a mixture of branched chain plastics;
  a mixture of linear chain plastics and branched chain plastics;
  a mixture of linear chain plastics and halogenated plastics;
  a mixture of halogenated plastics and branched chain plastics; and
  a mixture of halogenated plastics, branched chain plastics, and linear chain plastics.

13. The process according to claim 1, wherein said polymeric material is contaminated by other non-polymeric materials.

14. The process according to claim 1, wherein said polymeric material is a mixture of polymeric materials that originate from the management of waste selected from the group consisting of municipal solid waste and special waste.

* * * * *